Figure 1:
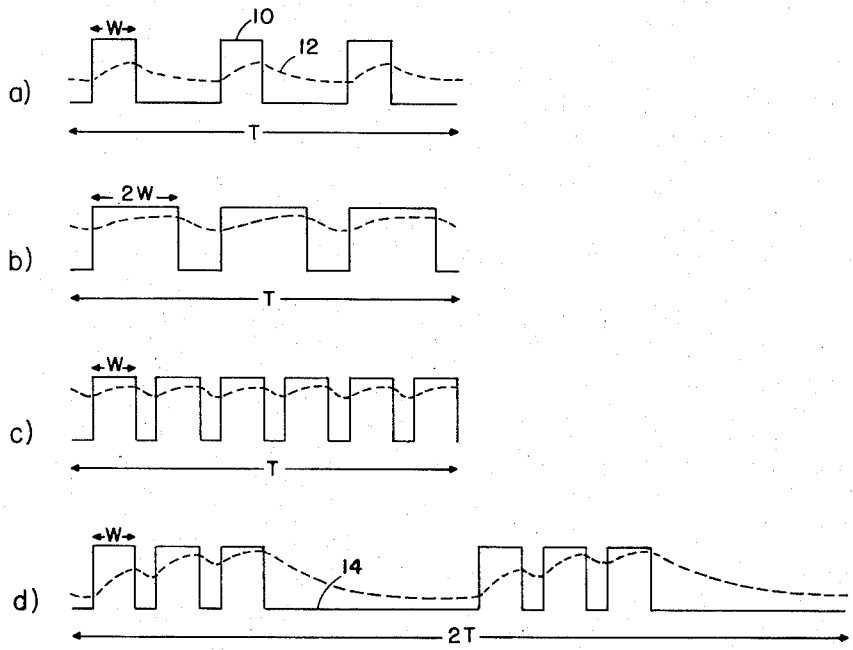

Aug. 8, 1961   M. SCHNEIDERMAN ET AL   2,995,683
CONTROL CIRCUIT
Filed Nov. 28, 1956

INVENTORS
MAX SCHNEIDERMAN
JOHN BURGOYNE FISHER
BY
Darby & Darby
ATTORNEY(S)

United States Patent Office 2,995,683
Patented Aug. 8, 1961

2,995,683
CONTROL CIRCUIT
Max Schneiderman, Clifton, and John Burgoyne Fisher, Bloomfield, N.J., assignors, by mesne assignments, to Fairchild Camera and Instrument Corporation, Syosset, N.Y., a corporation of Delaware
Filed Nov. 28, 1956, Ser. No. 624,832
9 Claims. (Cl. 317—22)

This invention relates to electrical control, and more particularly to a voltage sensitive device for automatically limiting and reducing the output of a source of electrical energy to within a safe operating range.

Heretofore, current responsive devices such as relays were employed, in conjunction with voltage sensitive gas discharge tubes, in the power supplies of the voltage generators, or directly in series with the output tubes. Excessive current in any tube would cause the device to disable the power supply. High currents were required to operate large, slow acting components which were insensitive to rapid changes. Accuracy of control was dependent upon power supply regulation and no timing or level adjustments were available. These devices gave indirect detection and control and lacked sensitivity and flexibility.

It is therefore the principal object of the present invention to provide an improved circuit for control of a source of electrical voltage.

It is another object of the invention to provide a novel circuit for regulating and adjusting the maximum average voltage of a source of electrical energy.

Still another object of the invention is to obtain greater accuracy and sensitivity in an overload protection device and to provide a warning when output limits are exceeded.

A further object is to provide greater flexibility, more direct detection and rapid response in an automatic protective switching device.

A still further object is to provide automatic reduction of overload to within allowable limits by periodically interrupting the output of the voltage source, utilizing a voltage sensitive element which controls a current responsive switching device.

According to our invention, the output voltage of a source of electrical energy, such as an alternating, direct, or pulse voltage generator, or other repetitive function generators, is averaged through an integrating network and controls the grid potential of a vacuum tube which in turn controls plate current. Under normal conditions the tube conducts current at a level much below that at which a series relay in the plate circuit is set to operate, while under overload conditions, the tube conducts at a considerably higher level and the relay is activated. Circuits energized by the relay temporarily disable the voltage source; provide a warning that maximum limits have been exceeded; and permit a negative bias source to be applied to the grid to decrease tube conduction after a specified charging time, causing the relay to release. Thereupon, the voltage source is permitted to resume operation and supply output. The tube then returns to its original condition for a period until conduction increases again to reactivate the relay. This cycling action and warning indication continue in an adjustable regulated pattern, reducing the overload condition automatically until it is remedied at the voltage source.

The detailed description and accompanying drawings which follow consider the protection circuit as used in conjunction with a pulse generator for the voltage source. It is to be understood that this represents but one embodiment chosen for purposes of explanation and illustration and is not to be construed as defining the limits of the invention. In addition, the invention is not to be restricted to utilization of a vacuum tube control element where substitution of other devices such as transistors may be made, or a relay where vacuum tube or diode switches may be employed. The switching device may be placed in the cathode circuit as well as in series with the plate. The invention may also be applied to regulation of minimum voltage limits or can be utilized with negative rather than positive pulses by rearranging relay contact connections and by use of phase inverters.

Figure 2:
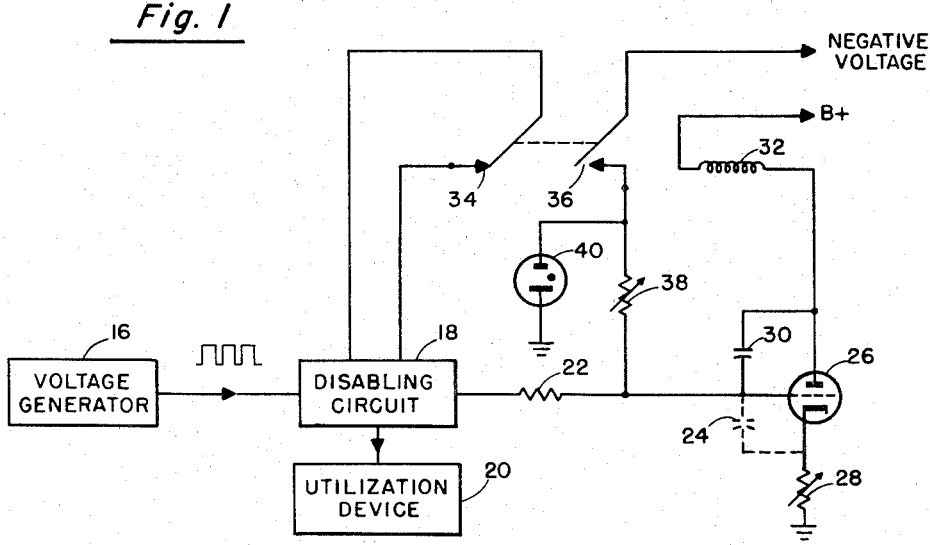

FIG. 1 shows several trains of positive pulses which may represent the output of a voltage generator; and
FIG. 2 shows a detailed schematic diagram of the circuit.

Referring now to FIG. 1, three variations of the output of a pulse generator are illustrated, having different pulse widths and/or repetition rates and constant amplitude. Pulse width represents the time of duration of one pulse. Repetition rate is the number of such pulses occurring in a fixed period of time. The solid line 10 of FIG. 1(a) shows three pulses of width W, occurring in time T. The dotted line 12 of FIG. 1(a) represents the average voltage which is obtained after passing through an integration network, which will be hereinafter explained. FIG. 1(b) shows three pulses of width 2W occurring in time T. FIG. 1(c) shows six pulses of width W occurring in time T. FIG. 1(d) shows six pulses of width W and two intervals 14 occurring in time 2T.

The combination of pulse width and repetition rate may be referred to as duty cycle. This represents time in which pulses are produced as compared to total operating time of the generator. Thus, a 20% duty cycle indicates that pulses occur for 20% of the time, while the intervals between pulses occupy the remaining 80%.

Duty cycle determines the energy output of the generator. A greater number of pulses or an increase in their duration, occurring in a fixed period, will produce energy for a greater percentage of time and therefore result in increased output. Similarly, a smaller number of pulses or decreased pulse widths produce less output.

It can be seen that the pulses of FIG. 1(b) are twice the width of those in FIG. 1(a) having twice the duration in time, and result in a duty cycle double that of the first series of pulses. The pulses of FIG. 1(c) occur at twice the frequency, having double the number of pulses in the same period of time, and similarly result in a duty cycle twice that of FIG. 1(a).

FIG. 1(d) represents the pulse output with the overload circuit of the instant invention in operation. This will be more fully discussed later.

Referring now to FIG. 2, a waveform of positive pulses, such as that of FIG. 1(a), is produced by a voltage generator 16 and passes through a disabling circuit 18, into a utilization device 20. Utilization devices may include cathode ray oscillograph test instruments, computing apparatus, equipment for monitoring radar duty cycle, or the like. The pulses also pass from the disabling circuit through an integration network, comprising a series resistor 22, a parallel stray capacitor 24, from the grid to the cathode of vacuum tube 26, representing interelectrode capacitance, which is grounded through cathode resistor 28, a second capacitor 30, which is effectively in parallel with capacitor 24, from the grid to the plate of the tube through relay coil 32, and thence through the direct voltage power supply to ground. The integration network converts the pulse waveform into a positive average voltage, such as waveform 12 of FIG. 1(a), which is a function of the duty cycle and supplies this voltage to the grid of tube 26.

The series resistor 22 and capacitors 24 and 30, effectively in parallel from grid to ground, form a long time constant discharge circuit. Referring to waveform 12 of FIG. 1(a), the capacitors charge rapidly in a well known manner on the appearance of the leading edge of the first positive pulse and continue charging for the duration of the pulse width, then discharge during the interval between pulses. Due to the long time constants, discharge occurs slowly and a substantial voltage is retained until the following pulse appears causing further charging. This effect results in a spreading of the pulse voltage over a larger area, as shown below the dotted line 12 of FIG. 1(a). This produces an average voltage over a period of time T, with peak variations being fairly small. When pulse duration or rate increases as in FIGS. 1(b) and 1(c), the capacitors have less time in which to discharge, thus maintaining a higher voltage charge which results in a larger area under the curve and a higher average voltage applied to the grid of tube 26. Thus, average voltage is dependent upon duty cycle.

The positive average voltage applied to the grids adds to a quiescent negative bias voltage to regulate the average flow of plate current in the tube and through relay coil 32, which coil is in series with the plate and the source of positive potential. A variable resistor 28 in series with the cathode furnishes the quiescent bias voltage and controls the sensitivity of the tube, thereby determining the relation between grid voltage and plate current. The tube is close to cutoff, with very slight conduction during quiescent or no-signal conditions. The current increases proportionately as grid bias voltage becomes more positive, with the change in bias potential being sensed and amplified by the tube. The relay coil is designed to activate a normally closed contact 34 and normally open contact 36 above a selected plate current level which is representative of a specific maximum permissible duty cycle or average voltage. The value of average voltage that produces the fixed current which activates the relay is determined by adjustment of the variable cathode resistor, thus establishing a permissible bias potential level corresponding to the desired duty cycle limit. The long time constant integration network permits sampling of several pulses before causing operation of the overload circuit. A greater duty cycle causes average voltage to build up more rapidly and results in faster activation of the relay.

Under normal generator output or duty cycle conditions, represented by the voltage pulses of FIG. 1(a), the grid voltage maintains tube conduction at a current level below that at which the relay is activated, and production of pulses continue uninterruptedly. Overload conditions arise when pulse width or rate is increased at the generator controls. This results in the generator output tubes drawing excessive current, causing overheating and the danger of tube failure; an undesirable condition which is avoided by our invention. As duty cycle or output increases, average voltage and grid potential increase positively, causing higher tube and relay current until the permissible bias, representing the selected overload level, is reached. The corresponding current then causes the relay to trip, opening contact 34 and closing contact 36.

Contact 34 controls a disabling circuit shown as block 18 which immediately halts the generation of pulses for a specified time interval. This may be accomplished for example, by supplying a negative pulse to the control grid of a tube which triggers the operation of pulse voltage generator 16 so that the trigger tube will be cutoff and cause the generator to cease production of pulses supplied to a utilization device 20. Another method may be to disconnect the direct voltage supply to the screen grid of a pulse amplifier tube feeding the pulse output stage, thereby preventing the flow of pulses.

At the same time, contact 36 closes, completing a path from a source of negative potential through a large value resistor 38 to the control grid of tube 26. The negative potential is applied to the grid at a rate determined by the values and charging time of capacitor 30 and resistor 38. Conduction through tube 26 is reduced by the negative charge on the grid until it reaches the point at which the relay is deenergized, this point being much below that at which the relay activates. At that time the relay releases, causing the disabling circuit to become inoperative and permitting pulse generation to continue, capacitor 30 to lose its negative charge and begin integrating positive pulses, reestablishing a permissible bias on the grid, and permitting tube 26 to again conduct. If the overload persists, average voltage builds up and the switching cycle repeats, with the relay contacts opening and closing at the rate determined by the R-C time constant circuit of resistor 38 and capacitor 30, thus automatically regulating and limiting the average voltage output or allowable duty cycle. The duration of the interval in which pulse generation is suspended may be adjusted by varying the value of resistor 38 in the timing network. The regulating action is illustrated in FIG. 1(d).

With a duty cycle such as shown in FIG. 1(a) established as the maximum permissible level, an attempt to increase output or duty cycle at the instrument controls to that represented by the waveforms of FIG. 1(b) or FIG. 1(c), will produce a higher average voltage which will activate the overload protection circuit and result in the regulated intermittent wave form similar to that of FIG. 1(d). The first series of pulse indicates the high duty cycle set at the source which after a short period causes disablement of the generator. The interval 14 of FIG. 1(d), between the series of pulses, occurs when the protective switch temporarily interrupts the generator. When the relay releases, production of pulses is permitted to recur, as shown by the second series of pulses. It can be seen that total output time compared to off time is substantially reduced. Thus, average voltage as demonstrated by the dotted line, and duty cycle are brought to within the acceptable limits. This on-off cycling condition continues until the overload is remedied at the generator by reducing pulse width or frequency, below the critical level.

The operation of the relay contacts produces a periodic audible clicking sound which serves as a warning to the operator. In addition, each time contact 36 closes, a path in parallel with the timing network is completed from the negative potential source to ground through a neon gas discharge tube 40, which lights accordingly during the cutoff interval and presents a visible warning indicating the existence of overload condtions.

The automatic overload protection circuit described above provides more sensitivity, flexibility, and control than previously available. Current requirements are low and response is rapid. Voltage generator outputs are kept accurately within prescribed limits to prevent damage and at the same time both visual and audible warning signals are presented.

While only a single embodiment of the invention has been indicated, it will be apparent that the invention is not limited to the exact forms or use illustrated and that many variations may be made in the particular design and configuration without departing from the scope of the invention as set forth in the appended claims.

What is claimed is:

1. A control circuit comprising means providing a source of voltage pulses having variable average voltage amplitudes resulting from variable duty cycles and a permissible average voltage amplitude; voltage sensing means having input, output and common electrodes; means to derive a voltage from said average voltage amplitudes and to apply said voltage to said input electrode to cause current flow through said voltage sensing means in accordance with said average voltage amplitudes; means to establish an operating potential level between said input and common electrodes to control said current flow; a first direct voltage supply means; current sensitive means connected in series between said direct voltage means and said output electrode and operable upon the occurrence of current corresponding to an average voltage amplitude exceeding said permissible average voltage amplitude; first means operated by said current sensitive means upon said occurrence to temporarily interrupt said output; second means operated by said current sensitive means upon said occurrence to automatically de-energize said current sensitive means and reestablish output from said source after a predetermined interval of time, whereby continual periodic disablement of said source occurs when said average voltage amplitude exceeds said permissible average voltage amplitude to thereby maintain said average voltage amplitude within said permissible amplitude.

2. The device of claim 1 wherein said voltage sensing means comprises a vacuum tube amplifier having grid input, plate output and common cathode electrodes.

3. The device of claim 1 wherein said means to derive and apply said voltage to said input electrode includes an R–C integrating circuit comprising a resistor connected in series between said source and said input electrode and a capacitor connected in parallel with said input electrode.

4. The device of claim 1 wherein said means to control said current flow includes an adjustable bias resistor in series with said common electrode.

5. The device of claim 1 wherein said current sensitive means includes a relay coil, and said first means operated by said current sensitive means includes a normally closed contact which opens upon said occurrence.

6. The device of claim 1 wherein said second means operated by said current sensitive means includes a normally open contact which closes upon said occurence, an adjustable R–C timing network connected to said input electrode, a second source of direct voltage connected through said contact to said timing network and input electrode to apply said direct voltage to said input electrode and to reduce current flow through said voltage sensing means and de-energize said current sensitive means after said predetermined time interval.

7. The device of claim 6 including visible indicating means adapted to be energized by said second means and de-energized after said time interval, whereby periodic flashing occurs when said average voltage amplitude exceeds said permissible average level amplitude.

8. A control circuit comprising a pulse generator having variable output levels and a permissible duty cycle level; a vacuum tube amplifier stage having grid input, plate output and common cathode electrodes; an R–C integrating circuit comprising a resistor connected in series between said generator and said grid input electrode and a capacitor connected in parallel with said grid electrode, to derive from said pulse output levels a corresponding average voltage and apply said average voltage to said grid electrode to cause current flow through said amplifier stage in accordance with said output levels; an adjustable bias resistor connected in series with said cathode electrode to establish an operating potential level between said grid and cathode to control said current flow; a first source of direct voltage; a relay coil connected in series between said first direct voltage source and said plate electrode and operable upon the occurrence of current corresponding to an output level exceeding said permissible duty cycle level; a normally closed first contact operated by said relay upon said occurrence to open said first contact and temporarily interrupt said output; a normally open second contact operated by said relay upon said occurrence to close said second contact; an adjustable R–C timing network connected to said grid; a second source of direct voltage connected through said second contact to said timing network and grid to apply said direct voltage to said grid to reduce current flow through said amplifier, deenergize said relay and automatically reestablish output from said generator after a predetermined time interval, whereby continual periodic interruption of said generator output occurs when said output exceeds said permissible level while maintaining average voltage within said permissible level.

9. The device of claim 8 including a gaseous discharge indicating tube connected in parallel with said timing circuit and adapted to be energized by said second contact upon said occurrence and deenergized after said timing interval, whereby periodic flashing occurs when said output exceeds said permissible level.

References Cited in the file of this patent

UNITED STATES PATENTS

| | | |
|---|---|---|
| 2,473,344 | McCown | June 14, 1949 |
| 2,567,928 | Farmer | Sept. 18, 1951 |
| 2,590,973 | Jordan | Apr. 1, 1952 |
| 2,600,317 | Nagel | June 10, 1952 |
| 2,654,052 | Mayer | Sept. 29, 1953 |
| 2,683,866 | Samsel | July 13, 1954 |
| 2,811,675 | McGee | Oct. 29, 1957 |